(12) United States Patent
Huang et al.

(10) Patent No.: US 7,517,482 B2
(45) Date of Patent: Apr. 14, 2009

(54) METHOD FOR PRODUCING POLYMERIC MEMBRANES WITH HIGH-RECOVERY RATE

(75) Inventors: Tung-Liang Huang, Hsinchu (TW); Ting-Huei Wang, Hsinchu (TW); Chun-Wei Lai, Toufen Township, Miaoli County (TW); Tai-An Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 380 days.

(21) Appl. No.: 11/269,611

(22) Filed: Nov. 9, 2005

(65) Prior Publication Data

US 2007/0102350 A1  May 10, 2007

(51) Int. Cl.
*B29C 65/00* (2006.01)
*B01D 39/00* (2006.01)
*B01D 39/14* (2006.01)

(52) U.S. Cl. .................. 264/41; 264/212; 210/500.27; 210/500.32; 210/500.3; 210/500.29; 210/500.41

(58) Field of Classification Search ............ 210/500.27, 210/500.23, 500.29, 500.3, 500.31, 500.33, 210/500.41, 500.32; 264/41, 212
See application file for complete search history.

(56) References Cited

U.S. PATENT DOCUMENTS

| | | | | |
|---|---|---|---|---|
| 4,197,148 A * | 4/1980 | Shinomura | ................... | 156/79 |
| 4,280,970 A * | 7/1981 | Kesting | ....................... | 264/1.7 |
| 4,631,157 A | 12/1986 | Johnson | | |
| 4,720,345 A * | 1/1988 | Linder et al. | ................. | 210/650 |
| 4,786,976 A * | 11/1988 | Takao et al. | ................... | 358/2.1 |
| 4,968,733 A | 11/1990 | Müller et al. | | |
| 5,708,040 A * | 1/1998 | Hong et al. | ................... | 521/64 |
| 5,739,316 A | 4/1998 | Beer et al. | | |
| 5,942,120 A * | 8/1999 | Wilkinson | ................... | 210/651 |
| 5,981,338 A * | 11/1999 | Lee | ............................. | 438/257 |
| 6,056,903 A | 5/2000 | Greenwood et al. | | |
| 6,540,915 B2 * | 4/2003 | Patil | ....................... | 210/500.27 |
| 6,850,435 B2 * | 2/2005 | Tanaka | ................... | 365/185.08 |

* cited by examiner

*Primary Examiner*—Ana M Fortuna
(74) *Attorney, Agent, or Firm*—Bacon & Thomas, PLLC

(57) ABSTRACT

A method for preparing polymeric membranes is disclosed, which has the following steps: (a) forming a casting solution by dissolving cellulose triacetate (CTA) and polyether-sulfone (PES) in a solvent mixture containing n-methyl pyrrori-done (NMP) and hydrogen chloride (HCl); (b) forming a membrane from said casting solution; and (c) recovering said membrane. The method of present invention provides an asymmetrical, microporous, polymeric membrane with a high recovery rate of nucleic acids and desirable bulk and surface properties. Also, the membrane so-produced is useful to the application of material separations by filtration and the like, especially the condensation of nucleic acids from a crude sample by filtration.

11 Claims, 1 Drawing Sheet

(a)

(b)

(a) (b)

METHOD FOR PRODUCING POLYMERIC MEMBRANES WITH HIGH-RECOVERY RATE

BACKGROUND OF THE INVENTION

1. Field of the Invention

The present invention relates to a polymeric membrane and, more particularly, to a polymeric membrane that is suitable for ultrafiltration, purification, concentration, dialysis and the related uses.

2. Description of Related Art

It is known that the genetic origin or the functional activity of cells can be determined and investigated by analyzing their nucleic acids. In fact, molecular biological analyses are applied to medical diagnosis, clinical diagnosis, evaluation of pharmaceutical compositions, food analysis, food production monitoring, cultivation of crops, cultivation of farm animals, and environmental analysis.

In a procedure of nucleic acids extraction, concentration and purification are required steps to obtain high-quality nucleic acids from biological materials. So far, the most useful way to concentrate and purify nucleic acids from crude samples is utilizing an ultrafiltration membrane. Ultrafiltration is a pressure-driven, convective process that separate species by molecular size and shape. Ultrafiltration membranes retain nucleic acid but are permeable by smaller components. However, nucleic acids in a biological sample often block the pores of the ultrafiltration membrane, resulting in decrease of efficiency of ultrafiltration.

Many kinds of membrane for isolating nucleic acids, as well as the related manufacturing process have been developed recently. For example, a process for cross-linking a cellulose hydrate membrane by the use of a water-soluble diepoxide in an alkaline solution is disclosed in U.S. Pat. No. 5,739,316. The membrane produced is highly resistant to alkalis, acids and cellulases. Also, a phase inversion process for the preparation of cellulose triacetate (CTA) and regenerated cellulose membranes is disclosed in U.S. Pat. No. 4,631,157. The membranes produced are durable, flexible, and chemically stable. However, the physical strength of these membranes is not strong enough, such that a supporting layer is required. Another method for making a microporous, skinless, and essentially symmetrical polyethersulfone membrane is disclosed in U.S. Pat. No. 6,056,903. The membrane produced in U.S. Pat. No. 6,056,903 demonstrated the advantages of an ultra-low binding rate of protein, a very high flow rate and the desired physical strength. However, for the application of concentration of nucleic acid, the sample recovering rate is relatively low compared to cellulose triacetate membranes, regenerated cellulose membranes, and cellulose acetate membranes.

For practical applications, a membrane is expected to have both acceptable bulk and surface properties. Nevertheless in most cases, an available membrane has either only desirable bulk properties (for example, mechanical strength, or solvent resistance) or surface properties (for example, water wettability, low protein absorbing tendency, thromboresistivity, controlled ion exchange capacity, or controlled surface chemical reactivity). For example, polyethersulfone (PES) membranes have appropriate mechanical strength. Nevertheless, the separation property of the PES membrane is poor. On the other hand, cellulose triacetate (CTA) is a preferable membrane material because of its ultra-high capacity for removing salts and recovering small molecules. However, the physical strength is weak.

Therefore, it would be beneficial to develop a method for making a membrane that has both desirable bulk and surface properties.

Making porous membranes from mixed polymers is a well-known technique, for example, U.S. Pat. No. 4,968,733 discloses the concept for making membranes from mixed polymers; the polymers include polyether-sulfone, polyvinylidene fluoride, polyerher-imide, polysulfone, polyethylene terephthalate, polyacrylonitrile, polymethyl methyacrylate and polycarbonate. An essential solvent, ε-caprolactom, is also a required element in the disclosure. However, no example in the reference demonstrates the best working conditions or results for making membranes from mixed polymers, for example, PES and CTA. Besides, the best mixing ratio of mixed polymers is not disclosed in the article. In the field of polymer membrane manufacture, the conditions for making membranes with different polymers mixed, especially from polymers with distinct properties, are difficult to deduce from previous experience. Here the working conditions are demonstrated, including the selection of solvent, non-solvent and additive for making PES/CTA mixed polymer membrane.

SUMMARY OF THE INVENTION

The objective of the present invention is to provide a method for producing polymeric membranes with a high recovery rate for nucleic acids. Moreover, the membrane produced has both desirable bulk properties and surface properties.

Another objective of the present invention is to provide a method for producing an asymmetrical microporous polymeric membrane which is used for material separation by filtration and the like, especially for the concentration of nucleic acids from a crude sample by filtration.

To achieve the objective, the method for producing polymeric membranes of the present invention includes: (a) formation of a casting solution by dissolving cellulose triacetate (CTA) and polyether-sulfone (PES) in a solvent mixture containing n-methyl pyrrolidone (NMP) and hydrogen chloride (HCl); (b) formation of a membrane from said casting solution; (c) precipitation of said membrane; and (d) washing and drying said membrane.

The method of the present invention discloses steps for making a microporous polymeric membrane by controlling the composition of the casting solution. The method of the present invention overcomes the difficulties of the method for making polymeric membranes through the conventional casting solution with improper solvents and materials with poor compatibility. The key factor of the method for making fine membranes is the selection of solvent, additive, non-solvent for membrane precipitation, as well as the ratio of each component in the solvent of a casting solution.

The cellulose triacetate (CTA) of the casting solution of the present invention preferably ranges from 0.5 wt % to 18 wt % based on the weight of total casting solution. More preferably, the casting solution in step (a) contains 1 wt % to 15 wt % CTA based on the weight of total casting solution.

The polyether-sulfone (PES) used in the casting solution of the present invention preferably ranges from 7.0 wt % to 25 wt % based on the weight of total casting solution. More preferably, the percentage of PES used in the casting solution the present invention ranges from 7.5 wt % to 20 wt % based on the weight of total casting solution.

The solvent mixture in step (a) of the present invention preferably contains n-methyl pyrrolidone(NMP) and hydrogen chloride (HCl). The mixture can selectively further comprise 0.3% to 2.0% HCl based on the weight of the total casting solution. More preferably, the percentage of HCl used in the solvent mixture of the present invention ranges from 0.46% to 1.85% based on the weight of total casting solution.

The dissolving temperature for preparing the casting solution for making a membrane can be any temperature. Preferably, the CTA is dissolved in the casting solution at a temperature of 70° C. to 90° C., and more preferably, at a temperature of 80-85° C.

The cross-sections of the polymeric membranes obtained from the present method can be of any shape. Preferably, the polymeric membranes obtained from the present method have asymmetrical cross-sections. The casting membrane of step (b) of the present invention can be performed by any conventional step. Preferably, the casting the membrane of the present invention is performed by a wet inversion process. The term "asymmetrical" refers to a condition where the surface pores, although somewhat smaller than those of the interior, nevertheless are similar in size. The pores of the membrane enlarge gradually from the surface through the interior structure.

The so-prepared casting solution may then be cast by conventional techniques into thin films, beads, fibers, and hollow fibers. In the case of films, a spreader knife over a glass plate or other smooth surface such as Teflon™ at an ambient temperature and pressure may be used to prepare films. Beads, fibers, and hollow fibers can be prepared by following the disclosures in the art.

The thin layer of casting dope is then moved into a coagulating bath. The composition of this bath is prepared from diethyl glycol by adding 0-70% water, and more preferably 1-55% of water.

The polyethersulfone polymer used here is not limited. Suitable polyethersulfone polymers are the polyethersulfone known with the trade names ULTRASON E from BASF, RADEL-A from AMOCO Chemicals, or the like.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
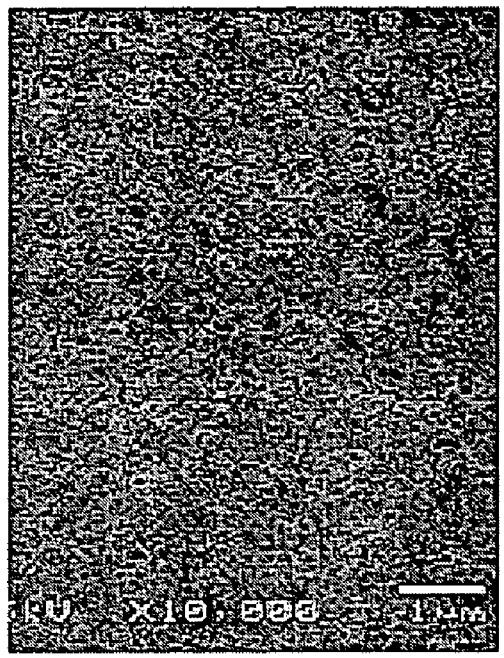
FIGS. 1(a) to 1(b) show scanning electron micrographs of the membrane obtained.
Figure 1:
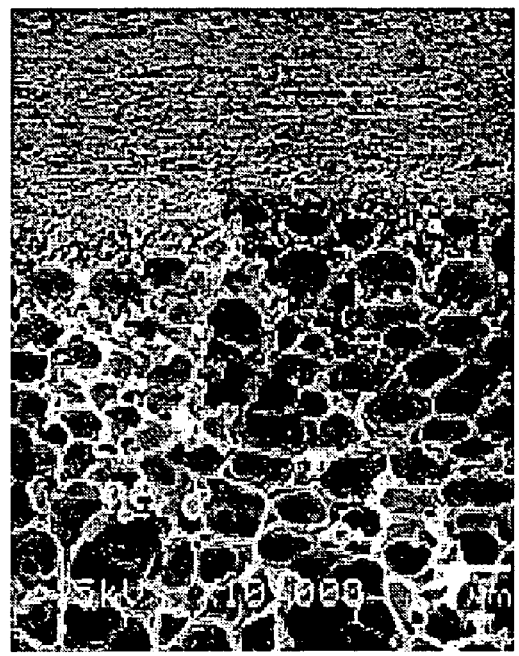

So far, only a few methods for manufacturing CTA membranes have been reported, due to the limited choices of solvent for CTA. Actually, it is known that the properties of a membrane depend on the homogeneity of the casting solution for manufacturing the membrane. In the following embodiment of the present invention, n-methylpyrroridone (NMP) is used to dissolve CTA for making a homogenized solution.

The preparation method involved in the present invention is the same as that of "phase inversion" in the art. The relative humidity (22±3%) and temperature (room temperature) of the casting environment were standardized and maintained for the preparation of membranes. The casting and gelation conditions were maintained constant throughout, since the thermodynamic conditions would largely affect the morphology and performance of the resulted membranes.

A casting solution was prepared by mixing polyether sulfone (AMOCO Chemicals, RADEL-A300), cellulose triacetate, HCl, and n-methyl pyrrolidone (NMP) at a higher temperature (70-90° C.). After cooling to room temperature, the casting solution was spread on a glass plate using a casting knife. Following the casting step, the membrane was immersed in a precipitation bath of diethylene glycol for two hours. The resulting membrane was washed with deionized water and then air-dried.

EXAMPLE 1

A casting solution was prepared at 80 ° C. by mixing 15% polyethersulfone (Radel A-300), 4% cellulose triacetate, 1.85% HCl, and 81.65% n-methyl pyrrolidone (NMP). The percentage of each component is based on the total weight of the whole cast solution.

Once the polymers were fully dissolved, the solution was de-bubbled using ultrasonication. A stable, clear and homogeneous was formed.

After cooling to room temperature, the casting solution was spread on a glass plate using a casting knife. Following casting, the membrane was immersed in a precipitation bath of 75% diethylene glycol for two hours. The resulting membrane was washed with deionized water and then dried by air.

The membrane so-produced is semi-hydrophilic, and exhibits a water flow rate of about 0.8 ml/min/cm$^2$ at 10000×g force.

EXAMPLE 2

A casting solution was prepared at 80° C. by mixing 15% polyethersulfone (Radel A-300), 6% cellulose triacetate, 1.85% HCl, and 82.15% n-methyl pyrrolidone (NMP). The percentage of each component is based on the total weight of the whole cast solution.

Once the polymers were fully dissolved, the solution was de-bubbled using ultrasonication. A stable, clear and homogeneous was formed.

After cooling to room temperature, the casting solution was spread on a glass plate using a casting knife. Following casting, the membrane was precipitated with 50% diethylene glycol for two hours. The resulting membrane was washed with deionized water and then dried by air.

The membrane so-produced is semi-hydrophilic, and exhibits a water flow rate of about 0.5 ml/min/cm$^2$ at 10000×g force.

EXAMPLE 3

A casting solution was prepared at 70° C. containing 12.5% polyethersulfone (Radel A-300), 1% cellulose triacetate, 0.925% HCl and 87.075% n-methyl pyrrolidone (NMP). The percentage of each component is based on the total weight of the whole cast solution.

Once the polymers were fully dissolved, the solution was de-bubbled using ultrasonication. A stable, clear and homogeneous was formed.

After cooling to room temperature, the casting solution was spread on a glass plate using a casting knife. Following casting, the membrane was precipitated with 65% diethylene glycol for two hours. The resulting membrane was washed with deionized water and then dried by air.

The membrane so-produced is semi-hydrophilic, and exhibits a water flow rate of about 1.1 ml/min/cm$^2$ at 10000×g force.

EXAMPLE 4

A casting solution was prepared at 90° C. containing 12.5% polyethersulfone (Radel A-300), 2% cellulose triacetate, 1.85% HCl and 75.15% n-methyl pyrrolidone (NMP). The percentage of each component is based on the total weight of the entire cast solution.

Once the polymers were fully dissolved, the solution was de-bubbled using ultrasonication. A stable, clear and homogeneous was formed.

After cooling to room temperature, the casting solution was spread on a glass plate using a casting knife. Following casting, the membrane was precipitated at 55% diethylene glycol for two hours. The resulting membrane was washed with deionized water and dried by air.

The membrane so-produced is hydrophilic, and exhibits a water flow rate of 3.125 ml/min/cm$^2$ at 8000×g force.

COMPATATIVE EXAMPLE 1

A comparative casting solution was prepared by mixing 20% polyethersulfone (Radel A-300), 5% cellulose triacetate, 2.775% HCl, and 72.23% dimethylacetamide (DMA). The percentage of each component is based on the total weight of the entire cast solution.

This mixture was incubated at 90° C. for at least one week. A heterogeneous, tar-like solution was observed, and such is not appropriate for membrane casting.

COMPARATIVE EXAMPLE 2

A comparative casting solution was prepared by mixing 15% polyethersulfone (Radel A-300), 4% cellulose triacetate, 1.85% HCl, and 79.15% dimethylsulfide (DMSO). The percentage of each component is based on the total weight of the entire cast solution.

This mixture was incubated at 90° C. for at least one week. A cloudy and heterogeneous solution was observed. Moreover, the particles of CTA were not dissolved thoroughly, and not appropriate for membrane casting.

COMPATATIVE EXAMPLE 3

A comparative casting solution was prepared by mixing 7.5% polyethersulfone (Radel A-300), 2.5% cellulose triacetate, 0.185% HCl, and 9.82% n-methyl pyrrolidone (NMP). The percentage of each component is based on the total weight of the entire cast solution. This mixture was incubated at 50° C. for at least one week. A heterogeneous solution was observed. Moreover, the particles of CTA were not dissolved thoroughly, and not suitable for membrane casting.

COMPATATIVE EXAMPLE 4

Commercial YM-30 (Millipore, MWCO=30 KDa) membranes are used as bench markers, for the applications of ultrafiltration and concentration.

EXAMPLE 9

The morphology of produced membranes was analyzed by scanning electron microscopy (SEM), and the results are shown in FIG. 1.

FIG. 1(a) shows the outer region of the produced membrane (1:10000), which has the morphology of fine pores and uniformly open structure. FIG. 1(b) is the microscopic evaluation of the fraction surfaces (1:10000). The cells of the produced membrane shown in FIG. 1(b) are more compact toward one end of the fraction within the asymmetrical structure of the fraction, the direction of filtrating step begins at the compact end and extends to the loose end.

EXAMPLE 10

To characterize these membranes, a water flux was determined by passing 500 μl Milli-Q water through the tested membrane assembled into a spin column (5-mm in diameter), under 10,000×g centrifugation force, and the concentration efficiency was examined by the capability of concentrating a solution containing a 495 base-pair DNA sample. The results are shown in table 1.

TABLE 1

| Items | Recovery Rate* | Concentration efficiency* |
|---|---|---|
| example 1 | 0.98 (0.030)* | 1.8 (0.26) |
| example 2 | 0.95 (0.047) | 2.2 (0.18) |
| example 3 | 0.90 (0.05) | 1.7 (0.28) |
| example 4 | 0.87 (0.026) | 1.5 (0.21) |
| comparative example 1 | N/A | N/A |
| comparative example 2 | N/A | N/A |
| comparative example 3 | N/A | N/A |
| comparative example 4 | 0.87 (0.020) | 1.8 (0.15) |

*averages of 3 measurements. The parentheses show the standard deviation.

The results of examples 1-4 show both higher values of recovery rate and concentration efficiency than those of the comparative examples 1-4.

In addition, the produced membranes in examples 1-4 demonstrate desirable mechanical strength, such that there is no need for supporting layers with the use of the membranes.

Although the present invention has been explained in relation to its preferred embodiment, it is to be understood that many other possible modifications and variations can be made without departing from the spirit and scope of the invention as hereinafter claimed.

What is claimed is:

1. A method for preparing polymeric membranes, comprising the steps of following:
   (a) forming a casting solution by dissolving 0.5 wt % to 18 wt % cellulose triacetate (CTA) based on the total weight of the casting solution and 7.0 wt % to 25 wt % polyether-sulfone (PES) based on the total weight of the casting solution in a solvent mixture containing n-methyl pyrroridone (NMP) and from 0.3% to 2.0% based on the total weight of the casting solution of hydrogen chloride (HCl) at a temperature of 70° C. to 90° C.
   (b) forming a membrane from said casting solution;
   (c) precipitating said membrane in a precipitation bath; and
   (d) washing and drying said membrane.

2. The method as claimed in claim 1, wherein said casting solution in step (a) comprises 7.5 wt % to 20 wt % polyether-sulfone (PES) based on the total weight of the casting solution.

3. The method as claimed in claim 1, wherein said solvent mixture in step (a) comprises hydrogen chloride (HCl) from 0.46% to 1.85%, based on the total weight of the casting solution.

4. The method as claimed in claim 1, wherein said cellulose triacetate (CTA) is dissolved in said casting solution at temperatures of 70° C. to 90° C.

5. The method as claimed in claim 4, wherein said cellulose triacetate (CTA) is dissolved at temperature of 80° C.

6. The method as claimed in claim 1, wherein said precipitation bath is a solution of diethyl glycol with water, wherein the concentration of diethyl glycol is 45-99% by volumes of the entire volume of the solutions.

7. The method as claimed in claim 1, wherein said precipitation bath is a solution of diethyl glycol with water, wherein the concentration of diethyl glycol is 30-100% by volumes of the entire volume of the solutions.

8. The method as claimed in claim 1, wherein said polymeric membranes obtained by said method have asymmetrical cross-sections.

9. A method for preparing polymeric membranes, comprising the steps of following:
(a) forming a casting solution by dissolving 1 wt % to 15 wt % cellulose triacetate (CTA) based on the total weight of the casting solution and 7.5 wt % to 20 wt % polyethersulfone (PES) based on the total weight of the casting solution in a solvent mixture containing n-methyl pyrroridone (NMP) and from 0.46% to 1.85% based on the total weight of the casting solution of hydrogen chloride (HCl) at a temperature of 80° C.;
(b) forming a membrane from said casting solution;
(c) precipitating said membrane in a precipitation bath; and
(d) washing and drying said membrane.

10. The method as claimed in claim 9, wherein said precipitation bath is a solution of diethyl glycol with water, wherein the concentration of diethyl glycol is 45-99% by volumes of the entire volume of the solutions.

11. The method as claimed in claim 9, wherein said polymeric membranes obtained by said method have asymmetrical cross-sections.

* * * * *